United States Patent
Flood et al.

(10) Patent No.: US 6,492,618 B1
(45) Date of Patent: Dec. 10, 2002

(54) AUTOMATIC WELD HEAD ALIGNMENT AND GUIDANCE SYSTEM AND METHOD

(75) Inventors: Dale A. Flood, El Dorado Hills, CA (US); Jerald W. Vanderpol, Shingle Springs, CA (US)

(73) Assignee: Tri Tool Inc., Rancho Cordova, CA (US)

( * ) Notice: Subject to any disclaimer, the term of this patent is extended or adjusted under 35 U.S.C. 154(b) by 9 days.

(21) Appl. No.: 09/703,835

(22) Filed: Nov. 2, 2000

(51) Int. Cl.[7] .................................................. B23K 9/12
(52) U.S. Cl. .................................................. 219/125.11
(58) Field of Search ........................ 219/125.11, 125.1, 219/125.12, 124.34; 901/42

(56) References Cited

U.S. PATENT DOCUMENTS

| | | |
|---|---|---|
| 4,144,992 A | 3/1979 | Omae et al. |
| 4,273,988 A | 6/1981 | Iceland et al. |
| 4,288,020 A | 9/1981 | Searles et al. |
| 4,365,132 A | 12/1982 | Kazlauskas et al. |
| 4,508,953 A * | 4/1985 | Murakami et al. ..... 219/125.12 |
| 4,629,853 A | 12/1986 | Yttergren et al. |
| 4,645,902 A * | 2/1987 | Hayakawa ............. 219/125.11 |
| 4,658,112 A | 4/1987 | Thompson |
| 4,841,123 A | 6/1989 | Novak et al. |
| 4,870,247 A * | 9/1989 | Fukuoka et al. ......... 219/125.1 |
| 4,935,597 A | 6/1990 | Zimmer |
| 4,959,523 A | 9/1990 | Fihey et al. |
| 5,053,976 A * | 10/1991 | Nose et al. .................... 901/42 |
| 5,534,676 A | 7/1996 | Rinaldi et al. |
| 5,825,655 A * | 10/1998 | Nakagawa et al. .... 364/474.17 |

\* cited by examiner

*Primary Examiner*—Clifford C. Shaw
(74) *Attorney, Agent, or Firm*—Bacon & Thomas (57) ABSTRACT

A system for aligning and guiding a weld head or torch along a desired weld path includes a travel mechanism for moving a weld head assembly along a fixed path and a steering mechanism for moving a weld head or torch relative to the fixed path in order to follow a desired weld path. A method of establishing the desired weld path includes the steps of establishing coordinates of the path by moving the weld head or torch to positions along the desired path and recording locations of the weld head or torch at the desired positions. Movement of the weld head or torch between the coordinates is achieved by interpolating a path as the weld head or torch is moved from one coordinate to the next following initiation of an automatic steering program.

22 Claims, 3 Drawing Sheets

AUTOMATIC WELD HEAD ALIGNMENT AND GUIDANCE SYSTEM AND METHOD

BACKGROUND OF THE INVENTION

1. Field of the Invention

This invention generally relates to the field of arc welding, and in particular to a system and method for aligning and guiding a welding head relative to a workpiece along an operator defined weld path, without the need for constant operator intervention.

The system and method of the invention replaces purely mechanical systems in which the weld path cannot easily be changed, as well as systems that permit the weld path to be changed by manual intervention during welding. By using the system and method of the invention, an operator may pre-set a guide path and vary the path as desired by selecting coordinates of discrete points along the path, the final path being provided by interpolation between adjacent points on the path.

Despite automating guidance of the weld head or torch during welding, the system and method of the invention does not require automatic sensing of the weld path through mechanical contour probing or the like, and therefore can easily be implemented by adding a simple remote control interface and steering motor or, in semi-automatic welding apparatus that already include a pendant, control station, or other remote control operator interface and a cross-seam drive motor, by modifying the control software. Because of its simplicity, the system and method of the invention can be implemented in a wide variety of arc welding systems, and can provide variation of the weld path along an arbitrary number of degrees of freedom.

2. Description of Related Art

It is well-known to remotely control welding operations by manually varying such parameters as arc length and cross-seam oscillation amplitude as the weld head is moved along a fixed path relative to the workpiece.

While the fixed path of conventional weld head guiding arrangements is in general adequate for simple orbital, circular, or linear weld paths, it is difficult to adjust the weld path during welding, requiring stoppage of the welding process and/or constant operator intervention to ensure that the weld head follows the desired path.

Adjustment of the weld path during welding is particularly difficult where the welding is carried out in harsh environments, such as in the presence of radioactivity or elevated heat, because of the difficulty in accessing the weld head during welding, and in situations where obstructions exist that inhibit or eliminate visual contact with the welding arc. Operation of a welding apparatus requires a considerable amount of skill due to the number of variables associated with the welding process, and adding weld head guidance to the tasks that the operator must perform only complicates the operator's task, making it more difficult to achieve a quality weldment. As a result, provision of a weld head self-guiding system and method according to the principles of the present invention would assist in the ease of operation and production of quality weldments in nearly all circumstances.

Conventional welding apparatus types which would benefit from automatic weld head guidance and alignment are semi-automatic orbital weld head, circular seam welding, and plane welding apparatus. For example, semi-automatic orbital weld heads are conventionally arranged to follow a path defined by a guide track as they orbit around a pipe or tube, but it is difficult to align the guide track with the intended weld line, and if the weld line does not follow a near perfect plane, some sort of operator intervention is necessary. On the other hand, in automatic weld heads used for welding circles, such as seal welds on tank lids, a central pivot system is used which causes the weld head to inscribe a near perfect circle even though the component to be welded may be eccentric relative to the torch path, or noncircular. Similar problems of workpiece irregularity exist for flat guide tracks used in plane welding.

The need for accurate guiding of the weld head is particularly critical in the case of semi-automatic GMAW or GTAW welding, with or without oscillation of the weld head, where an accurate root pass is critical in order to ensure that the land faces are fully fused/consumed. When a bevel or groove is being filled, the torch must be positioned to ensure proper bead-placement and sidewall-fusion without excessive build-up on either side of the weld. In order to apply conventional track guiding in such a system, frequent manual verification and adjustment of the track position is required, which is both time-consuming and expensive, or a complex contour sensing system such as the one disclosed in U.S. Pat. No. 4,935,597, in which contour probing in conjunction with a weld torch swivel mounting is required, greatly increasing the cost and complexity of the welding apparatus.

SUMMARY OF THE INVENTION

It is accordingly a first objective of the invention to provide a system and method for aligning and automatically guiding a weld head along an operator-defined path without the need for operator intervention during welding.

It is a second objective of the invention to provide an automatic weld head alignment and guidance system and method arranged to be easily adapted for use in existing arc welding apparatus, including semi-automatic orbital weld head apparatus, circular seam welders, and plane welders.

It is a third objective of the invention to provide a simple operator interface through which an automatic weld head guide path may be defined and varied, and an intuitive method of using the interface.

It is a fourth objective of the invention to provide an automatic weld head alignment and guidance system and method which may be implemented through an existing semi-automatic weld head pendant, control station, or remote control interface utilizing an existing steering motor, or which may alternatively be retrofitted onto a welding apparatus that lacks such a suitable pre-existing steering motor and remote interface.

These objectives are achieved, in accordance with the principles of a preferred embodiment of the invention, by providing a system and method in which the operator is able to preset a welding path by establishing coordinates along the weld line to maintain the torch on the center of the weld line, the system and method of the invention including an interpolating or curve-fitting function that establishes a smooth path between the coordinates established by the operator so as to follow the weld line without major steps or discontinuities.

In particular, the system of the invention includes a first weld head assembly drive arranged to move the weld head assembly in a travel direction along a fixed path, and a second steering drive, which may include one or more steering motors, for steering the weld head or a welding torch relative to the fixed path in order to guide the weld head or torch along a desired welding path relative to the fixed path in response to control signals from a controller that has been pre-programmed with the desired welding path. The weld head assembly drive may be a conventional drive motor arranged to move the weld head assembly along a track, or it may take the form of a robot arm arrangement, a pivot arm, or any other guidance mechanism for moving the weld assembly along the fixed path. The steering drive, on the other hand, may be a cross-seam drive motor such as the cross-seam drive motor conventionally used to cause cross-seam oscillation of the welding torch.

In accordance with the principles of the method of a preferred embodiment of the invention, programming of the desired weld path is carried out, by establishing a zero coordinate and moving the weld head along the first predetermined path while manually controlling the steering motor or motors to move the weld head to desired positions along the actual weld path, and recording the coordinates of the desired positions by storing the values of position encoders when the weld head is at the desired positions, the path being completed by interpolation between adjacent coordinates.

Interpolation of the path may be reduced in many cases, such as the case of an orbital pipe girth weld, to a simple slope calculation for a single axis offset function carried out by a single steering motor, such as the cross-seam drive motor conventionally provided in semi-automatic orbital welding apparatus. The slope curve can be calculated in terms of travel degrees of arc between points for a degree based weld head, or in terms of travel distance along a fixed path for a travel speed and time based weld head. The number of offset increments between preset points can then be calculated to an increment as small as the cross seam drive system is capable of, or set at a fixed number.

For the specific example of a semi-automatic welding apparatus having a travel motor and a cross-seam drive system, establishment of the zero coordinate may be carried out by having the operator initially position the weld head at a desired starting location by manually releasing a travel clutch and pushing/pulling the weld head to the desired travel location and re-engaging the same clutch, and/or by depression of the travel/steering jog buttons if available until the weld head is positioned to the desired starting location. The tungsten tip for GTAW or the filler wire for GMAW, GMAW-P, FCAW, or FCAW-P may be brought in close proximity to the workpiece and/or temporarily contacted with the workpiece to facilitate visual alignment. Alternatively, some sort of measuring device such as a camera including a lens indexed with cross-hairs or an alignment grid, could be used to further ensure accurate alignment of the weld head with the desired start location. Cameras would be especially useful for remote alignment, particularly in visually restricted or biologically hazardous areas, in which case the cameras could be mounted either on the weld held or locally.

When the weld head is located at the desired start location the operator depresses a button on the remote pendant or control station normally used during execution of a program while in either the test or the weld mode to control such functions as cross-seam oscillation amplitude, thereby zeroing encoder counters for each axis (steering and travel), thus establishing the fixed start location. The operator then uses the jog buttons to move the weld head to a next location and presses the button that was used for zeroing encoder counters to establish the next location as a coordinate by recording the encoder values for the next location, and continues to move the weld head to establish new coordinates until sufficient coordinates have been established to follow the desired path. Additional coordinates can be established, or coordinates can be deleted, after a path is tested in a similar manner to that described above.

When the coordinates of the path have been established, a start or resume sequence is initiated, and a program line is encountered that initiates travel, the system will interpolate steering between adjacent coordinates to provide a smooth route or course for the weld head to track. Steering is adjusted in fine steps in accord with the steering points continuously interpolated between any two adjacent coordinates. This steering process will occur as long as a path exists, allowing its use for multiple passes.

In an especially preferred embodiment of the invention, the system permits steering overrides to be generated from the remote pendant, the steering override causing the entire path to move (offset) in the direction of the override in predefined increments, with the revised path being stored immediately upon execution of an override and retained upon de-energizing the system.

DETAILED DESCRIPTION OF THE PREFERRED EMBODIMENTS

Figure 1:
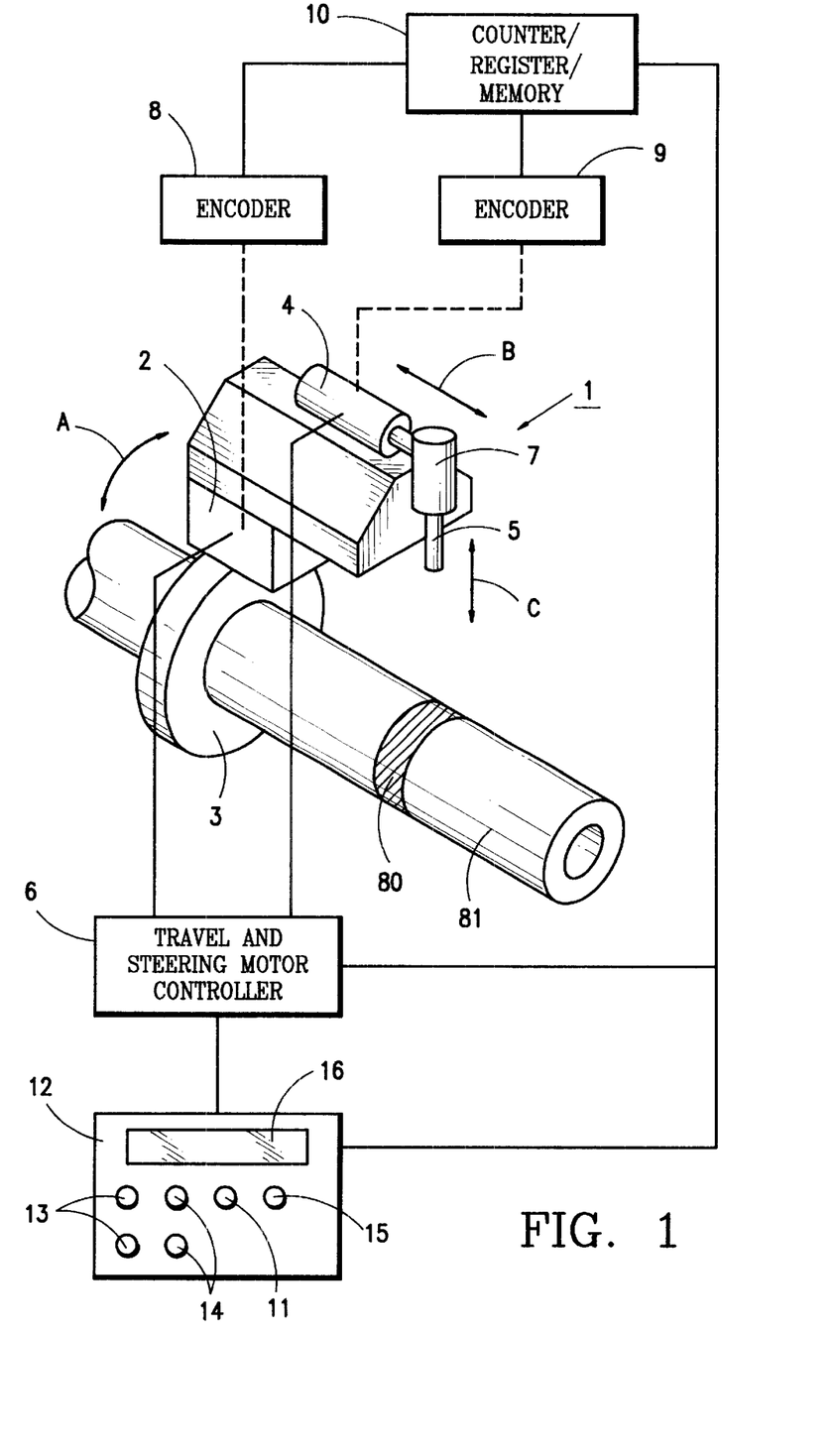
FIG. 1 is a schematic illustration of a semi-automatic welding system modified to include an automatic alignment and guidance function in accordance with the principles of a preferred embodiment of the invention.

As illustrated in FIG. 1, the system of the invention includes a weld head assembly 1 moved by a drive motor 2 in a travel direction indicated by arrow A along a first fixed path defined by a track 3. Track 3 causes the weld head assembly 1 to generally follow a seam 80 extending around a workpiece 81. Although illustrated as an orbital pipe girth welding apparatus of the type in which the weld head is propelled along a track by a motor, it will be appreciated by those skilled in the art that the principles of the invention could also be applied to a plane welding apparatus, in which the weld head is guided along a first fixed path by robot arms, a pivot arm, or other guidance mechanism for moving the weld head along the fixed path. The fixed path could be circular, linear, or any other shape.

As illustrated in FIG. 1, the weld head assembly 1 includes a steering motor 4 for moving a torch 5 within the weld head assembly 1 in a direction indicated by arrow B that is perpendicular to a tangent of the travel path defined by track 3 and indicated by arrow A. The steering motor 4 may be retrofitted onto a weld head assembly that does not otherwise include a suitable steering motor or, by way of example, may be an existing motor or cross-seam drive of the type conventionally included in pipe girth welding systems for the purpose of providing oscillations about the centerline of the weld path. In addition, the torch or weld head may be mounted on a cross-slide mechanism to assist in guidance of the head relative to the track. Regardless of the type of steering motor, since the track is not relied upon for fine positioning of the weld head or torch, the track may be crudely aligned and mechanically fixed to the surface utilizing standoff legs, nut/bolts and/or tack welds in general proximity to the weld path. Fine positioning of the weld head relative to the weld path is obtained by locating a reference point and preprogramming coordinates along the weld path and then using a curve fitting or interpolation formula to smooth the path between the set coordinates.

The system and method of the preferred embodiment of the invention may in general be a applied to any welding apparatus capable of incorporating a steering motor, with or without oscillation of the weld head, and a position-based drive. Examples of apparatus to which the principles of the invention may be applied include gas tungsten arc welding (GTAW), gas metal arc welding (GMAW), pulsed gas metal arc welding (GMAW-P), flux core arc welding (FCAW), and pulsed flux core arc welding (FCAW-P), although those skilled in the art will appreciate that the principles of the invention could also potentially be applied to other types of welding processes, such as plasma arc welding, submerged arc welding, laser welding, and so forth.

In the example of FIG. 1, a motor controller 6 provides control signals to motor 2 for controlling the position of the weld head assembly relative to the track 3, which in the case of an orbital welder is conveniently measured in degrees. Motor controller 6 also provides steering signals to the steering motor to control the position of the torch relative to a baseline defined by the track 3. If the steering motor 4 is a cross-seam drive motor of the type used to provide oscillations during welding, then the steering control signal may be superimposed on an oscillation signal during welding. In addition, motor controller 6 may supply control signals to a third motor 7 which moves the torch in a direction indicated by arrow C relative to the workpiece.

Attached to the weld head assembly are respective encoders 8 and 9 for sensing movement of the weld head assembly 1 in the travel direction and for sensing movement of the torch 5 relative to the weld head assembly in the steering direction, and counters, registers, and or memories 10 for storing the current positions detected by the encoders upon pressing of an appropriate button 11 on a pendant or remote interface 12 that permits operator control of the travel mechanism and steering motor. Those skilled in the art will appreciate that the encoders could be replaced by synchros, resolvers, potentiometers, or any other type of displacement transducer along with the appropriate interface electronics.

The operator interface for the system of the invention includes, in addition to button 11 for recording current encoder positions, jog buttons 13 for causing travel motor 2 to move the weld head in direction A along track 3 and jog buttons 14 for causing steering motor 4 to move the torch 5 in direction B relative to the fixed path. Although not shown, buttons may also be provided to manually vary the distance between the weld head and a workpiece. In addition, the operator interface includes a button 15 for deleting a prestored index location and a display 16 capable of displaying index locations. The display 16 preferably shows the current function or mode, such as indexing or welding, the position of the weld head, the current travel direction with an arrow, and the indices that the weld is positioned between.

The operator interface may be the same as the operator interface, known as a pendant or control station, used in a conventional semi-automatic welding arrangement. During welding, the buttons on the pendant have their usual functions, but when the system of the invention is in the programming mode, during which the coordinates of the weld path are set, the buttons used in welding operations are re-assigned to carry out the above-mentioned functions. For example, the oscillation increase and decrease buttons of the conventional semi-automatic weld head pendant, which are used during welding but are not used during the programming mode, may serve as the record and delete buttons 11 and 15. Alternatively, a separate programming interface may be provided to facilitate programming of the weld path.

It will be appreciated by those skilled in the art that although the illustrated system includes a single steering motor 4, the invention is not limited to apparatus having a weld path limited to two degrees of freedom, but instead may be extended to three-dimensional weld paths requiring two or more motors, in which case an encoder or displacement transducer will be provided for each of the degrees of freedom of movement of the welding assembly and torch. In addition, it will be appreciated that the steering motor may be arranged to move the entire weld head assembly rather than just the torch relative to the weld head, and that the weld head or torch may be guided by sliding arms or rods, pulleys, or any other suitable guiding mechanism.

Figure 2:
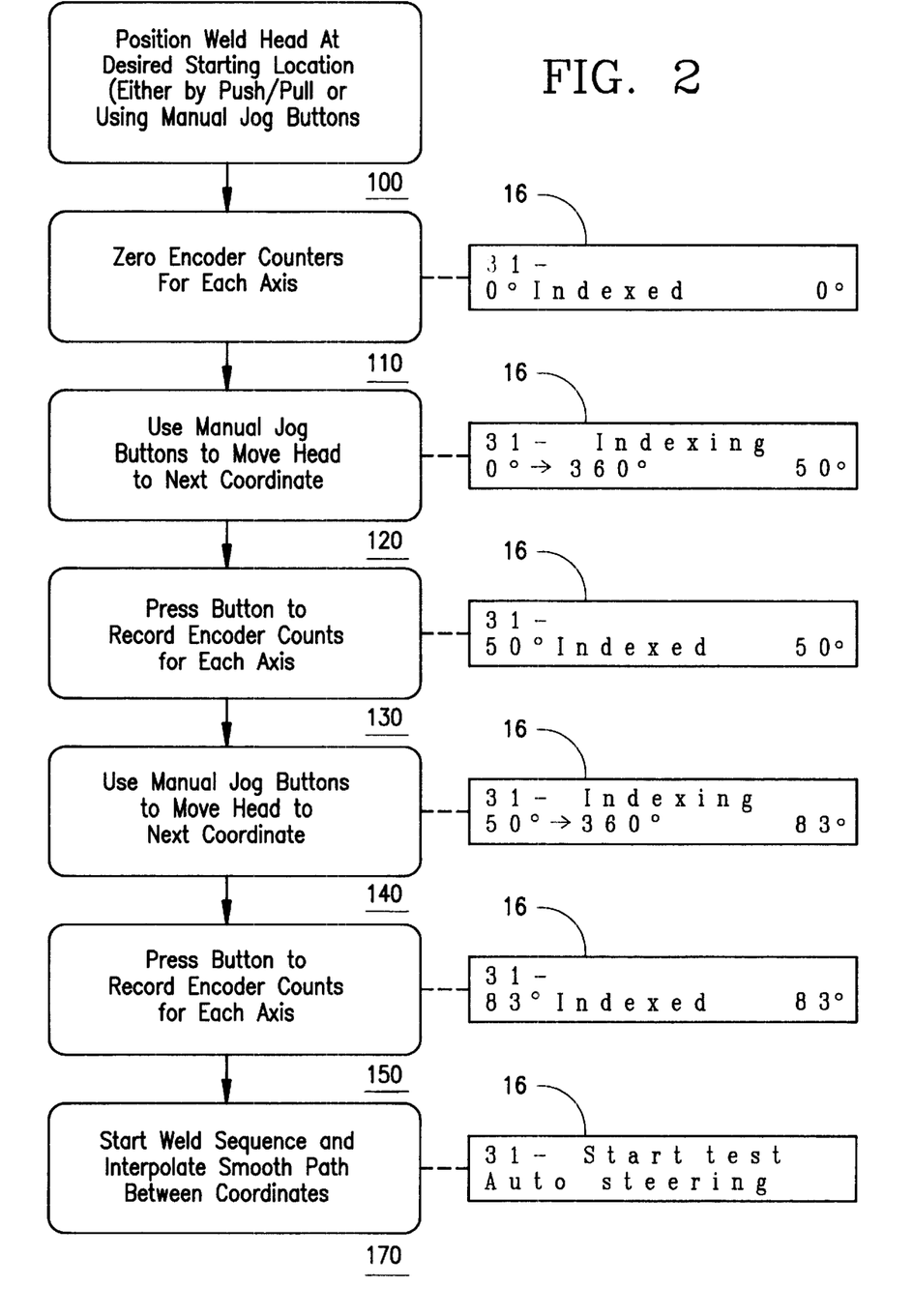
FIG. 2 is a flowchart illustrating the programming mode for an automatic alignment and guidance method in accordance with the principles of the preferred embodiment of the invention, including exemplary representations of the displays associated with each of the illustrated method steps.
Figure 3:
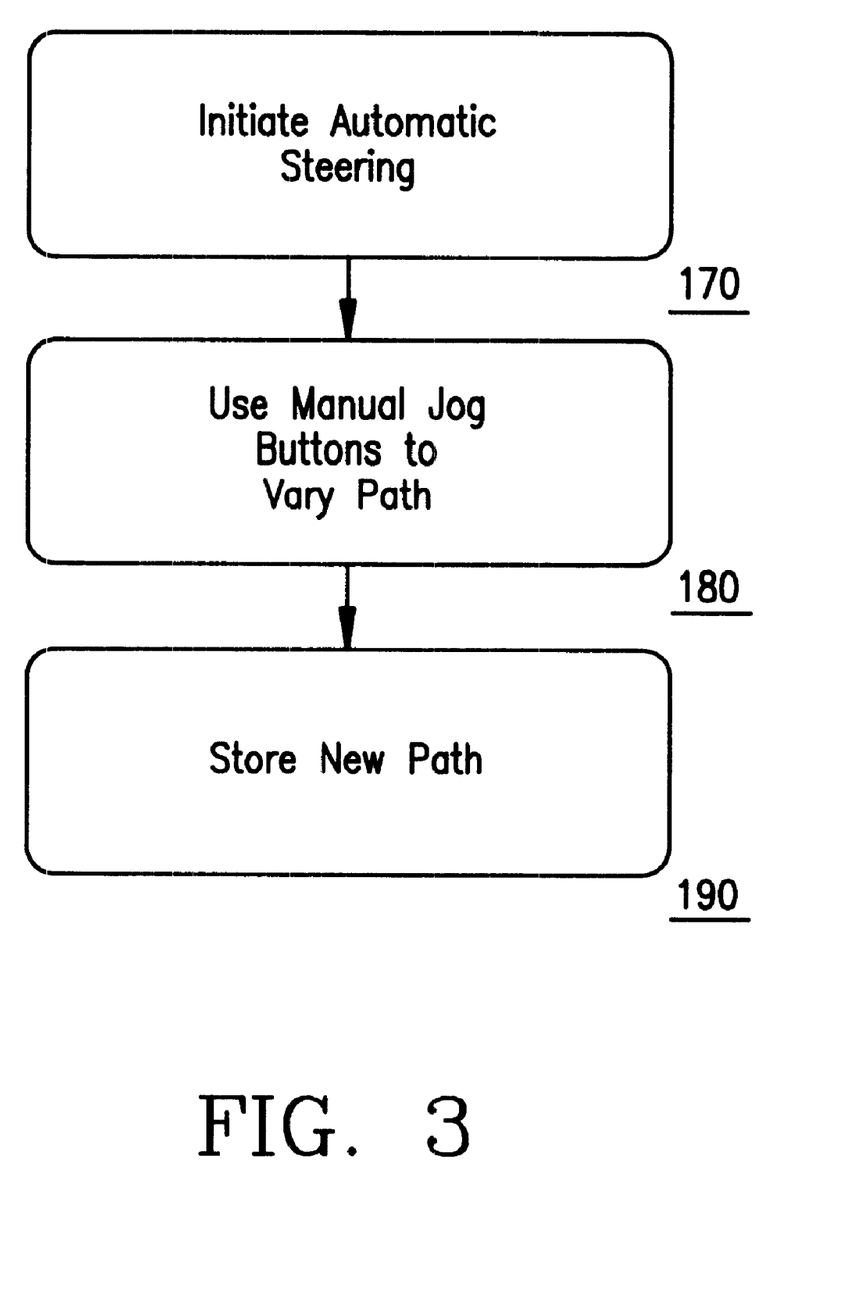
FIG. 3 is a flowchart illustrating an optional path varying function that may be added to the basic path setting method in accordance with the principles of a further preferred embodiment of the invention.

The method of the invention features a programming mode, illustrated in FIG. 2, in which coordinates of a path are established, a test mode, illustrated in FIG. 3, during which the path established during the programming mode is tested and varied if necessary, and a weld mode (not shown) in which the path established during the programming mode is used to guide a weld head during actual welding. In the main programming sequence of the programming mode, as illustrated in FIG. 2, the weld head or torch is initially positioned at a desired starting location (step 100), either manually or using the jog buttons 13,14 on the pendant. The encoder counters are then set to zero (step 110), for example by pressing the record button 11 when no indexed location has previously been set. The weld head or torch is then moved using the jog button 13,14 to the next location to be indexed (step 120), and the current location of the weld head or torch as indicated by the encoders 8,9 is stored (step 130), and the process is repeated (steps 140,150) until coordinates of a test path have been established. The test path program is then started to automatically move the weld head or torch along a path defined by the selected coordinates, with the controller interpolating a smooth path between the coordinates, after which the path may be varied by adding or deleting coordinates as necessary until the programmed path corresponds to a desired path.

Display 16 facilitates setting or programming of the weld path, as also indicated in FIG. 2, by displaying the current position of the weld head and the adjacent coordinates. Each time a location is indexed, the encoder counts relative to the fixed starting location are recorded for all axes and the results displayed on display 16. During movement of the weld head between indices, the indices that the weld is positioned between, an arrow indicating travel direction, and the position of the weld head are displayed. For example, in conjunction with corresponding method steps, the display depicted in FIG. 2 shows movement of the weld head from the initial zero degree position set in step 110 to 50°, setting of the 50° position as an index, and subsequent movement to an 83 degree position and setting of the next index at 83°. In order to delete an index, it is simply necessary to move the head to an index to be deleted, or to use display controls to recall a previous index, and press the delete button 15. In the case of an orbital welding apparatus, the display will reset to zero when 360° is reached, although in certain situations travel may be expressed in degrees beyond 360°, or in linear dimensions.

It will of course be appreciated by those skilled in the art that selected operator-performed steps may be protected by a "failsafe" function. For example, instead of simply deleting coordinates after the operator has pressed delete button 15, the operator may be prompted after initially pressing the delete button to confirm the deletion by pressing the delete button a second time, or by pressing another confirmation button. In addition, a "delete all" function may optionally be included in which, when the operator presses the delete button for a specified period of time, the operator will be prompted to confirm deletion of all coordinates by again pressing the delete button or another confirmation button.

As illustrated in FIG. 3, once a test path has been pre-programmed, the path may be varied during a test and/or weld mode by initiating an automatic steering sequence (step 170) and using the manual jog buttons 14 to vary the path (step 180), whereupon the new path is stored for retention even after the system has been de-energized (step 190). The varied test path then becomes the weld path when a weld sequence is initiated.

The manner in which interpolation between indexed coordinates is carried out depends on the type of weld path to which the principles of the invention are applied. Weld paths to which the principles of the invention may be applied include weld paths with angles, curvatures, indentations, and/or protrusions on the edges of the bevel that are to be joined or on surfaces that are to be built-up (welded), including circumferential pipe welds that may or may not be formed in a single hypothetical plane; circumferential mitered, i.e., elliptical pipe welds; circumferential multiple axes welds, such as saddle-on or fish-mouth shaped welds; circumferential plate welds that may or may not be formed in a true circle, including welds having a polygonal shape in which the polygon may or may not be formed with rounded angles or arcs; and elongated plate weld that is not linear, and that includes either or both angles and curvatures; and an overlay (build-up) weld that is not necessarily associated with two pipes/plates or other pieces of material to be joined.

In the case of a pipe girth weld, the path can be reduced in most cases to a simple slope calculation for a single axis offset function, calculated in terms of degrees of arc between points for a degree based weld head or in terms of travel distance for a travel speed and time based weld head. In that case the simple slope calculation takes the form:

$$[(y_2-y_1)/(x_2-x_1)](x_p-x_1)+y_1=y_p \qquad [1]$$

On the other hand, those skilled in the art will appreciate that even in the simple pipe girth example numerous other methods may be used to calculate a smooth path for the torch, including but not limited to cubic spline interpolation, which could take into account three points to generate a smooth path through each set point, two dimensional slope calculations for girth welding with significant changes in the radial plane as well as the axial plane, and circular interpolation for end seal welds.

Preferably, motor controller 6 interpolates steering between adjacent indices, i.e., the indices immediately preceding and following the present travel location. For example, in the case of a welding apparatus in which movement is measured in degrees, when the indices have been set to 0°, 18°, and 37°, steering is interpolated for travel locations between 0° and 18°, using indexed data recorded for 0° and 18° as the end points of the interpolation. After travel reaches 18°, steering is interpolated for travel locations between 18° and 37°, using indexed data recorded for 18° and 37° as the end points for interpolation.

Once the path is established, the weld head is caused to track the path as travel occurs. Rather than traveling in a straight line or orbiting in a plane, the control software causes the weld head to automatically steer to match the path during travel. Preferably, in both the test and weld modes, steering is adjusted in fine steps in accord with steering points continuously interpolated between any two indexed locations (additional indices may be required for more complex interpolations), instead of in large increments occurring upon reaching the next indexed location. During execution of a program while in either the test mode or the weld mode, the same path may be used for all passes. Alternatively, the path may be offset, altered, or a new path may be established.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

We claim:

1. An automated weld head alignment and guiding system, comprising:
    a travel mechanism arranged to move a weld head assembly along a fixed path generally parallel to a seam to be welded;
    a steering mechanism for moving the weld head or a torch in the weld head relative to the fixed path in order to follow a desired weld path;
    position determining devices for establishing a current position of the travel and steering mechanisms relative to a zero reference determined by zeroing said position determining devices at a first position to which said travel and steering mechanisms are moved by an operator;
    a recording device for recording index positions of the travel and steering mechanisms;
    a controller arranged to move said weld head or torch along the desired weld path established in part by recording said index positions to which the weld head or torch has previously been moved by said operator.

2. A system as claimed in claim 1, wherein said controller is arranged to move said weld head or torch between said index positions by interpolating paths between adjacent said index positions following initiation of an automatic steering program.

3. A system as claimed in claim 1, wherein said controller is arranged to move said weld head or torch between said index positions by interpolating paths between a plurality of said index positions following initiation of an automatic steering program.

4. A system as claimed in claim 1, wherein said travel mechanism comprises a track and a travel motor for moving the weld head assembly along said track, and wherein said steering mechanism comprises a cross-seam drive motor arranged to move said torch relative to the weld head assembly.

5. A system as claimed in claim 4, wherein said weld head assembly is a component of a semi-automatic orbital pipe girth weld system.

6. A system as claimed in claim 4, wherein said cross-seam drive motor is an oscillation drive motor.

7. A system as claimed in claim 1, wherein said steering mechanism includes at least one steering motor.

8. A system as claimed in claim 7, wherein said at least one steering motor is a cross-seam drive motor.

9. A system as claimed in claim 1, further comprising an operator interface including jog buttons for enabling an operator to move said weld head or torch between positions to be indexed, and a record button for causing the current position of the weld head or torch to be recorded as an index position.

10. An automated weld head alignment and guiding system, comprising:
   a travel mechanism arranged to move a weld head assembly along a fixed path generally parallel to a seam to be welded;
   a steering mechanism for moving the weld head or a torch in the weld head relative to the fixed path in order to follow a desired weld path;
   position determining devices for establishing a current position of the travel and steering mechanisms;
   a recording device for recording index positions of the travel and steering mechanisms;
   a controller arranged to move said weld head or torch along the desired weld path established in part by recording said index positions to which the weld head or torch has previously been moved by an operator; and
   an operator interface including jog buttons for enabling an operator to move said weld head or torch between positions to be indexed, and a record button for causing the current position of the weld head or torch to be recorded as an index position,
   wherein said operator interface is a control interface for a semi-automatic welding apparatus, and wherein said jog buttons and record button have different functions during welding than they have during establishment of the desired weld path.

11. An automated weld head alignment and guiding system, comprising:
   a travel mechanism arranged to move a weld head assembly along a fixed path generally parallel to a seam to be welded;
   a steering mechanism for moving the weld head or a torch in the weld head relative to the fixed path in order to follow a desired weld path;
   position determining devices for establishing a current position of the travel and steering mechanisms;
   a recording device for recording index positions of the travel and steering mechanisms;
   a controller arranged to move said weld head or torch along the desired weld path established in part by recording said index positions to which the weld head or torch has previously been moved by an operator; and
   an operator interface including jog buttons for enabling an operator to move said weld head or torch between positions to be indexed, and a record button for causing the current position of the weld head or torch to be recorded as an index position,
   wherein the controller is further arranged to permit the predetermined path to be manually varied as the weld head or torch is automatically moved along the path, the varied predetermined path being subsequently stored as a new predetermined path.

12. A method of establishing a predetermined weld path with respect to which a weld head or torch is automatically guided during welding, said weld head or torch being positioned by means of a travel mechanism and a steering mechanism including at least one steering motor, said travel mechanism and steering mechanism including respective position determining devices for indicating a current position of said travel and steering mechanisms, comprising the steps of:
   (A) moving a weld head assembly to an initial position;
   (B) after moving said weld head assembly to said initial position, zeroing said position determining devices at said initial position;
   (C) manually moving said weld head assembly to a second position;
   (D) recording values of said position determining devices at said second position;
   (E) repeating steps c and d for third and subsequent positions until coordinates of a desired weld path have been established;
   (F) initiating an automatic steering program in which said weld head or torch is moved between said coordinates, thereby following said desired weld path.

13. A method as claimed in claim 12, wherein step f comprises the step of interpolating paths between adjacent said coordinates in order to complete establishment of said desired weld path following initiation of the automatic steering program.

14. A method as claimed in claim 12, wherein step f comprises the step of interpolating paths between a plurality of said coordinates in order to complete establishment of said desired weld path following initiation of the automatic steering program.

15. A method as claimed in claim 12, further comprising the steps of manually varying said path by controlling said steering motor to cause said weld head or torch to depart from said desired weld path following initiation of the automatic steering program, and recording the varied path in order to establish a new weld path.

16. A method as claimed in claim 12, wherein steps b-e are carried out by pushing respective jog and record buttons on an operator interface of a semi-automatic welding apparatus.

17. A method as claimed in claim 12, further comprising the step of deleting pre-selected coordinates by pushing a button on said operator interface.

18. A method of controlling a position of a welding torch relative to a seam during welding, comprising the steps of:
   a. moving a weld head assembly including the torch along a predetermined fixed travel path;
   b. controlling a steering motor to move a torch relative to the weld head assembly along a weld path partially defined by a plurality of preset coordinates that have been established by manually steering said weld assembly to positions along the weld path and recording said coordinates at said positions;
   c. completing said weld path by interpolating a path between adjacent said preset coordinates.

19. Automatic weld head alignment and guidance software for controlling a position of a welding torch, comprising:
   means for storing coordinates of a desired weld path established by manually moving said welding torch to positions along the desired weld path corresponding to said coordinates; and
   means for interpolating between said stored coordinates to complete said desired weld path, wherein said means for storing coordinates of the desired weld path comprises means for:
   a. zeroing position determining devices upon movement of the weld head or torch under control of an operator to an initial position selected by the operator;

b. recording values of said position determining devices after said weld head or torch has been manually moved to a second position; and c. repeating step b for third and subsequent positions until coordinates of a desired weld path have been established.

20. Control software as claimed in claim 19, wherein said means for storing coordinates of the desired weld path comprises means for:

a. zeroing position determining devices upon movement of the weld head or torch to an initial position;

b. recording values of said position determining devices after said weld head or torch has been manually moved to a second position; and c. repeating step b for third and subsequent positions until coordinates of a desired weld path have been established.

21. Control software for controlling a position of a welding torch, comprising:

means for storing coordinates of a desired weld path established by manually moving said welding torch to positions along the desired weld path corresponding to said coordinates; and means for interpolating between said stored coordinates to complete said desired weld path; and further comprising means for manually varying said path by controlling said steering motor to cause said weld head or torch to depart from said desired weld path following initiation of the automatic steering program, and recording the varied path in order to establish a new weld path.

22. Control software for controlling a position of a welding torch, comprising:

means for storing coordinates of a desired weld path established by manually moving said welding torch to positions along the desired weld path corresponding to said coordinates; and means for interpolating between said stored coordinates to complete said desired weld path, wherein said control software is implemented by using an operator interface of a semi-automatic welding apparatus to program a controller of a cross-seam drive motor of the semi-automatic welding apparatus.

* * * * *

UNITED STATES PATENT AND TRADEMARK OFFICE
CERTIFICATE OF CORRECTION

PATENT NO.    : 6,492,618 B1
DATED         : December 10, 2002
INVENTOR(S)   : Dale A. Flood and Jerald W. Vander Pol

It is certified that error appears in the above-identified patent and that said Letters Patent is hereby corrected as shown below:

<u>Title page,</u>
Item [75], the second inventor's name should be -- Vander Pol -- not "Vanderpol".

Item [73], the assignee's name should be -- TRI TOOL INC. -- not "Tri Tool Inc."

Signed and Sealed this

Twenty-second Day of July, 2003

JAMES E. ROGAN
*Director of the United States Patent and Trademark Office*